United States Patent
Fiorentino (10) Patent No.: US 12,085,663 B2
(45) Date of Patent: Sep. 10, 2024

(54) METHOD FOR DETERMINING A LOCATION OF A USER DEVICE IN AN INDUSTRIAL FACILITY

(71) Applicant: Siemens Aktiengesellschaft, Munich (DE)

(72) Inventor: Vincenzo Fiorentino, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/265,474

(22) PCT Filed: Dec. 8, 2021

(86) PCT No.: PCT/EP2021/084681
§ 371 (c)(1),
(2) Date: Jun. 6, 2023

(87) PCT Pub. No.: WO2022/128649
PCT Pub. Date: Jun. 23, 2022

(65) Prior Publication Data
US 2024/0045020 A1 Feb. 8, 2024

(30) Foreign Application Priority Data
Dec. 14, 2020 (EP) ..................................... 20213767

(51) Int. Cl.
*G01S 5/14* (2006.01)
*G01S 5/02* (2010.01)
(Continued)

(52) U.S. Cl.
CPC ............ *G01S 5/14* (2013.01); *G01S 5/02216* (2020.05); *H04L 5/0048* (2013.01);
(Continued)

(58) Field of Classification Search
CPC .......... G01S 5/02216; H04W 74/0833; H04W 12/104; H04L 5/0048; H04L 64/003
See application file for complete search history.

(56) References Cited

U.S. PATENT DOCUMENTS

2020/0196298 A1* 6/2020 Edge ................... H04W 12/037
2020/0374656 A1 11/2020 Alawieh et al.

FOREIGN PATENT DOCUMENTS

| CN | 110839203 B * | 4/2021 | ............ H04W 4/023 |
| WO | 2019122080 A1 | 6/2019 | |
| WO | 2019158223 A1 | 8/2019 | |

OTHER PUBLICATIONS

Intel Corporation: "Analysis of Techniques for NR DL and UL Positioning"; RI-1900514 GPP TSG RAN WG1 Ad-Hoc Meeting 1901. Taipei, Taiwan; Jan. 20, 2019; XP051593425. pp. 1-9.
(Continued)

*Primary Examiner* — Muthuswamy G Manoharan
(74) *Attorney, Agent, or Firm* — Lempia Summerfield Katz LLC (57) ABSTRACT

The current disclosure discloses a method for determining a location of a user device in an industrial facility. The method includes: transmitting a localization request to a location controller via a first base station; receiving a response message at a second time instance from the first base station; transmitting a timing message to the first base station; transmitting a polling message to a second base station; receiving a second response message at a fifth time instance from the second base station; and transmitting a second timing message to the second base station. The location controller is configured to determine the location of the user device based on transmission time instances and reception time instances associated with the localization request, the (Continued)

polling message, the first and second response messages, and the first and second timing messages.

10 Claims, 5 Drawing Sheets

(51) Int. Cl.
  *H04L 5/00*  (2006.01)
  *H04W 12/104*  (2021.01)
  *H04W 64/00*  (2009.01)
  *H04W 74/08*  (2024.01)
  *H04W 74/0833*  (2024.01)
(52) U.S. Cl.
  CPC ....... *H04W 12/104* (2021.01); *H04W 64/003* (2013.01); *H04W 74/0833* (2013.01)

(56) References Cited

OTHER PUBLICATIONS

PCT International Search Report and Written Opinion of International Searching Authority mailed Mar. 7, 2022, corresponding to PCT International Application No. PCT/EP2021/084681.

\* cited by examiner

METHOD FOR DETERMINING A LOCATION OF A USER DEVICE IN AN INDUSTRIAL FACILITY

The present patent document is a § 371 nationalization of PCT Application Serial No. PCT/EP2021/084681, filed Dec. 8, 2021, designating the United States, which is hereby incorporated by reference, and this patent document also claims the benefit of European Patent Application No. 20213767.5, filed Dec. 14, 2020.

TECHNICAL FIELD

The current disclosure relates to wireless communication in industrial automation environments and more specifically, to mobile wireless communication devices in industrial facilities.

BACKGROUND

With increasing implementation of industrial internet of things and other Industry 4.0 concepts in factories, plants, and other industrial facilities, a plurality of assets in these facilities will be connected wirelessly. Several wireless networks and technologies such as cellular networks, local area networks, short range communication techniques such as Bluetooth, Near Field Communication, etc., may be utilized in enabling wireless communication.

SUMMARY AND DESCRIPTION

The current disclosure relates to localization of wireless devices in an industrial facility and more particularly, to localization and positioning of wireless devices associated with a cellular network.

The scope of the present disclosure is defined solely by the appended claims and is not affected to any degree by the statements within this summary. The present embodiments may obviate one or more of the drawbacks or limitations in the related art.

Due to the difficult indoor propagation conditions in industrial facilities, conventional positioning techniques may lead to a non-precise or even a false position estimation. This may be further compounded due to other factors like software or hardware failure, interference on the air interface, etc. Additionally, misconfiguration of the schedule of the positioning reference signals may lead to false positioning.

Such errors in positioning may have significant safety concerns in the context of industrial facilities. Especially, in industrial environment where workers are operating near automatic machines without protecting fences, localization errors with regards to such machines result in harm the workers. Accordingly, there is a need for a method and device which addresses the above mentioned issues.

Accordingly, the current disclosure describes methods, user devices, and location controllers that address the above-mentioned aspects.

Accordingly, the current disclosure discloses a method for determining a location of a user device in an industrial facility. The user device may connect to two or more base stations. The method includes: transmitting a localization request for localizing the user device to a location controller via a first base station from the two or more base stations; receiving a response message at a second time instance from the first base station; transmitting a timing message to the first base station; transmitting a polling message to a second base station from the two or more base station; receiving a second response message, at a fifth time instance, from the second base station; and transmitting a second timing message to the second base station. The response message from the first base station includes a first parity data generated by the location controller. The first parity data is used for providing that the subsequent messages between the user device and the base stations are in relation to the same session as the localization request. The timing message includes a second parity data based on the first parity data, wherein the second parity data is for verifying the timing message. The polling message includes a third parity data based on the first parity data, wherein the third parity data is for verifying the polling message. The second timing message includes a fourth parity data based on the first parity data, wherein the fourth parity data is for verifying the second timing message. The location controller is configured to determine the location of the user device based on transmission time instances and reception time instances associated with the localization request, the polling message, the first and second response messages, and the first and second timing messages.

Accordingly, the current disclosure teaches a method for determining the location of the user device in an industrial device. By using the first parity data, the location controller provides that all the subsequent messages from the user device belong to the same session as the initial localization request. This is especially useful since the user device connects to two or more base stations for determining the location of the user device. Accordingly, the method allows for providing that the messages from the user device belong to the same session and accordingly, improves effectiveness of the localization technique. Accordingly, variations caused by the misconfiguration of schedule of the positioning messages (or signals) is mitigated by using the parity data from the location controller.

In an example, the timing message further includes a timestamp associated with the second time instance and wherein the second timing message further includes a timestamp associated with the fifth time instance. In an example, the timing message includes a positioning reference signal including a plurality of symbols, wherein a first set of symbols from the plurality of symbols is associated with a time stamp of the second time instance.

In an example, the localization request is transmitted over one of a physical random access channel and physical uplink shared channel.

In an example, the method further includes receiving positioning initialization message from the localization message controller prior to transmitting the localization request. In an example, the first base station and the second base station include a first time slot assigned for the user device.

In another aspect, the current disclosure describes a method for determining a location of a user device in an industrial facility, wherein the user device is connectable to two or more base stations. The method by the location controller includes: receiving a localization request from the user device, via a first base station from two or more base stations; generating a first identifier for the first base station and a second identifier for the second base station for two or more localization communication sequences in relation to the user device; transmitting the first and second identifiers to the user device via the first base station, wherein the first and second identifiers are used by the user device for generating one or more parity data included in one or more messages of the two or more localization communication sequences; determining a first time difference and a second time difference based on a first localization communication sequence associated with the user device and the first base station; determining a third time difference and a fourth time difference based on a second localization communication sequence associated with the user device and the second base station; and determining the location of the user device based on the determined first, second, third, and fourth time difference.

In an embodiment, the first communication sequence includes a localization request from the user device to the first base station, a response message from the first base station to the user device and a timing message from the user device to the first base station, wherein the response message includes the first identifier associated with the first base station and wherein the timing message includes a timestamp associated with time instance at which the response message is received by the user device, and a first parity data based on the first identifier, wherein the first parity data is for verifying the timing message.

In an embodiment, the second communication sequence includes a polling message from the user device to the second base station, a second response message from the second base station to the user device, and a second timing message from the user device to the second base station. The second timing message includes a timestamp associated with time instance at which the second response message is received by the user device, and a second parity data based on the second identifier associated with the second base station. The second parity data is for verifying the second timing message.

In yet another aspect, the current disclosure describes a user device for determining a location of the user device in an industrial facility, wherein the user device is connectable to two or more base stations. The user device including a network interface connectable to the first base station and the second base station for receiving and transmitting data, and one or more processors connected to a memory module. The one or more processors are configured to: transmit a localization request for localizing the user device, to a location controller, via a first base station from the two or more base stations; receive a response message, at a second time instance, from the first base station, wherein the response message includes a first parity data generated by the location controller, transmit a timing message to the first base station, wherein the timing message includes a second parity data based on the first parity data, and wherein the second parity data is for verifying the timing message; transmit a polling message to a second base station from the two or more base stations, wherein the polling message includes a third parity data based on the first parity data, and wherein the third parity data is for verifying the polling message; receive a second response message, at a fifth time instance, from the second base station; and transmit a second timing message to the second base station, wherein the second timing message includes a fourth parity data based on the first parity data, and wherein the fourth parity data is for verifying the second timing message. Further, the location controller is configured to determine the location of the user device based on transmission time instances and reception time instances associated with the localization request, the polling message, the first and second response messages, and the first and second timing messages.

In yet another aspect, the current disclosure describes a location controller for determining a location of a user device in an industrial facility, the user device connectable to two or more base stations. The location controller includes one or more processors connected to a memory module. The one or more processors are configured to: receive a localization request from the user device, via a first base station from two or more base stations; generate a first identifier for the first base station and a second identifier for the second base station for two or more localization communication sequences in relation to the user device; transmit the first and second identifiers to the user device via the first base station, wherein the first and second identifiers are used by the user device for generating one or more parity data included in one or more messages of the two or more localization communication sequences; determine a first time difference and a second time difference based on a first localization communication sequence associated with the user device and the first base station; determine a third time difference and a fourth time difference based on a second localization communication sequence associated with the user device and the second base station; and determine the location of the user device based on the determined first, second, third and fourth time difference. The advantages of the methods apply to the devices described herein. These aspects are further described in relation to FIGS. 1-6.

BRIEF DESCRIPTION OF THE DRAWINGS

The following detailed description references the drawings, wherein.

DETAILED DESCRIPTION

Figure 1:
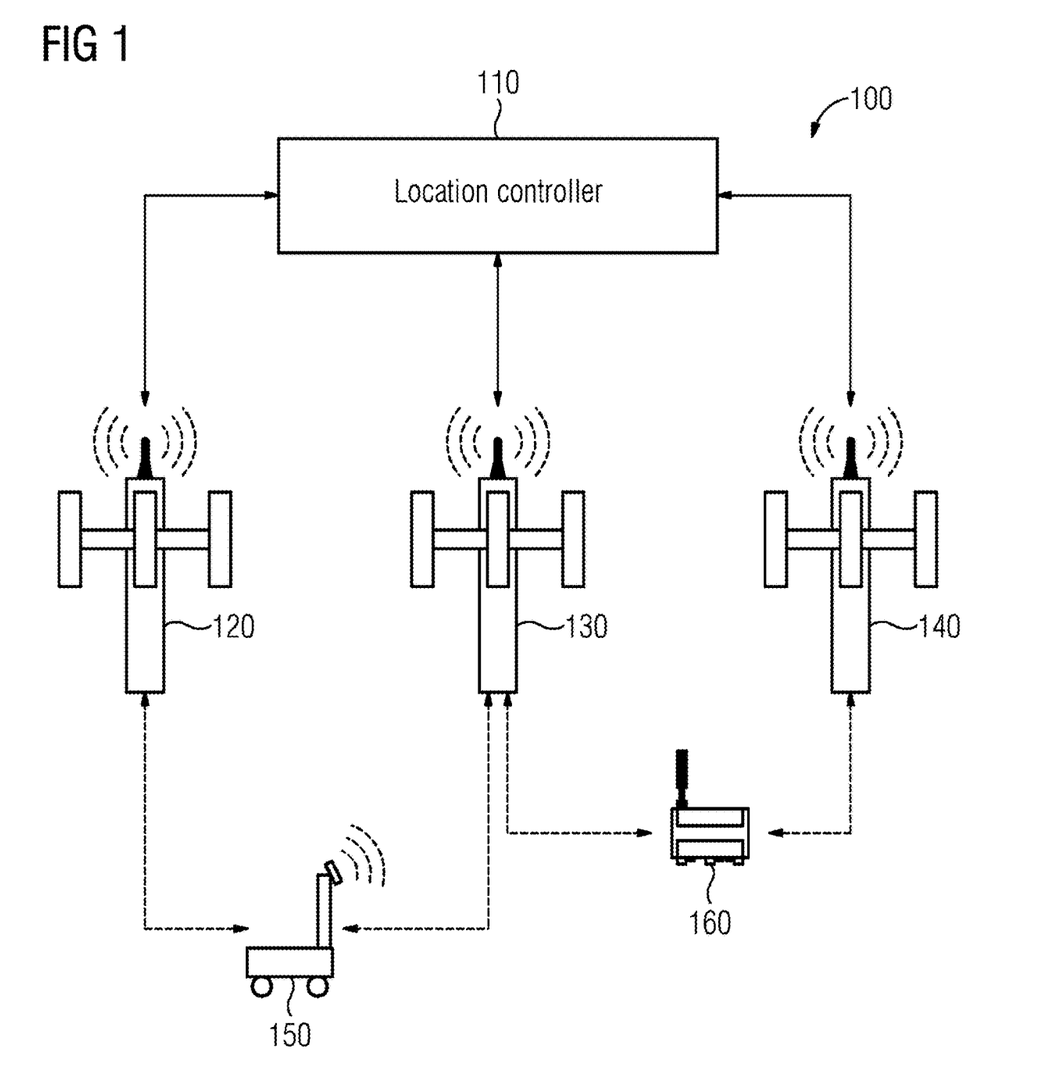
FIG. 1 illustrates an example section of an example industrial facility including a plurality of network devices of a wireless network in the industrial facility.

FIG. 1 illustrates an example section of industrial facility 100. The term "industrial facility" herein refers to any environment where one or more industrial processes such as manufacturing, refining, smelting, assembly of equipment may take place and includes process plants, oil refineries, automobile factories, etc. The industrial facility 100 includes a plurality of industrial devices including control devices, field devices, mobile devices, operator stations, etc. The control devices include process controllers, programmable logic controllers, supervisory controllers, automated guided vehicles, robots, operator devices, etc. One or more control devices are connected to a plurality of field devices (not shown in figure) such as actuators and sensor devices for monitoring and controlling industrial processes in the industrial facility 100. These field devices may include flowmeters, value actuators, temperature sensors, pressure sensors, etc.

Additionally, the industrial facility 100 includes a plurality of mobile devices including one or more robots for performing a plurality of operations such as welding, assembly of parts, one or more autonomous guided vehicles for transportation and handling of material, one or more assets with RFID tags on conveyor belts, one or more operator equipment with RFID tags, etc., in the industrial facility 100. Additionally, the industrial facility 100 may include an operator station for displaying the status of the industrial facility 100 to an operator and for allowing the operator to define KPIs for the control of the industrial processes in the facility. All the industrial devices may be connected to each other via a plant network (e.g., realized via wired and wireless technologies).

Communication in the above mentioned plant network happens through wired and wireless means or technologies. Accordingly, the industrial facility 100 includes a plurality of gateway devices (shown in the figure as a first base station 120, a second base station 130, and a third base station 140). Gateway devices herein refer to one or more network devices capable of connecting the user devices (such as user device 150 and user device 160) to the wireless network. Examples of gateway devices include base stations, routers, switches, relays, access points, etc. The plurality of gateway devices may include stationary gateway devices which may be affixed to a plurality of locations in the industrial facility, and mobile gateway devices which are capable of moving about the sections to provide appropriate network connectivity. The plurality of the user devices in the facility are connected to one or more industrial gateway devices to connect to the wireless network for communicating information with the other devices and systems in the industrial facility. In an example, the wireless network is based on 5G private network and utilizes one or more frequencies from the licensed frequency spectrum. In an example, the licensed frequency spectrum includes sub 6 ghz and mm wave frequencies as well. In an example, the wireless network utilizes frequencies from the unlicensed frequency spectrum as well. In another example, the wireless sub-network may be based on public cellular network or WLAN. User device herein refers to the controllers, the field devices, and other such industrial devices which connect to the gateway devices for connecting to the wireless network.

Additionally, the industrial facility 100 includes a location controller 110 connected to the gateway devices (hereinafter referred to as base stations) for determining the location of one or more user devices in the industrial facility. For example, the industrial facility includes a user device 150 capable of moving about the plurality of areas in the plant. In an example, the user device 150 is an automated guidance vehicle 150 and is capable of determining its location in coordination with the location controller 110. In an example, the user device 150 is a transponder device which may be used for positioning. This is explained in the description of FIG. 2.

Figure 2:
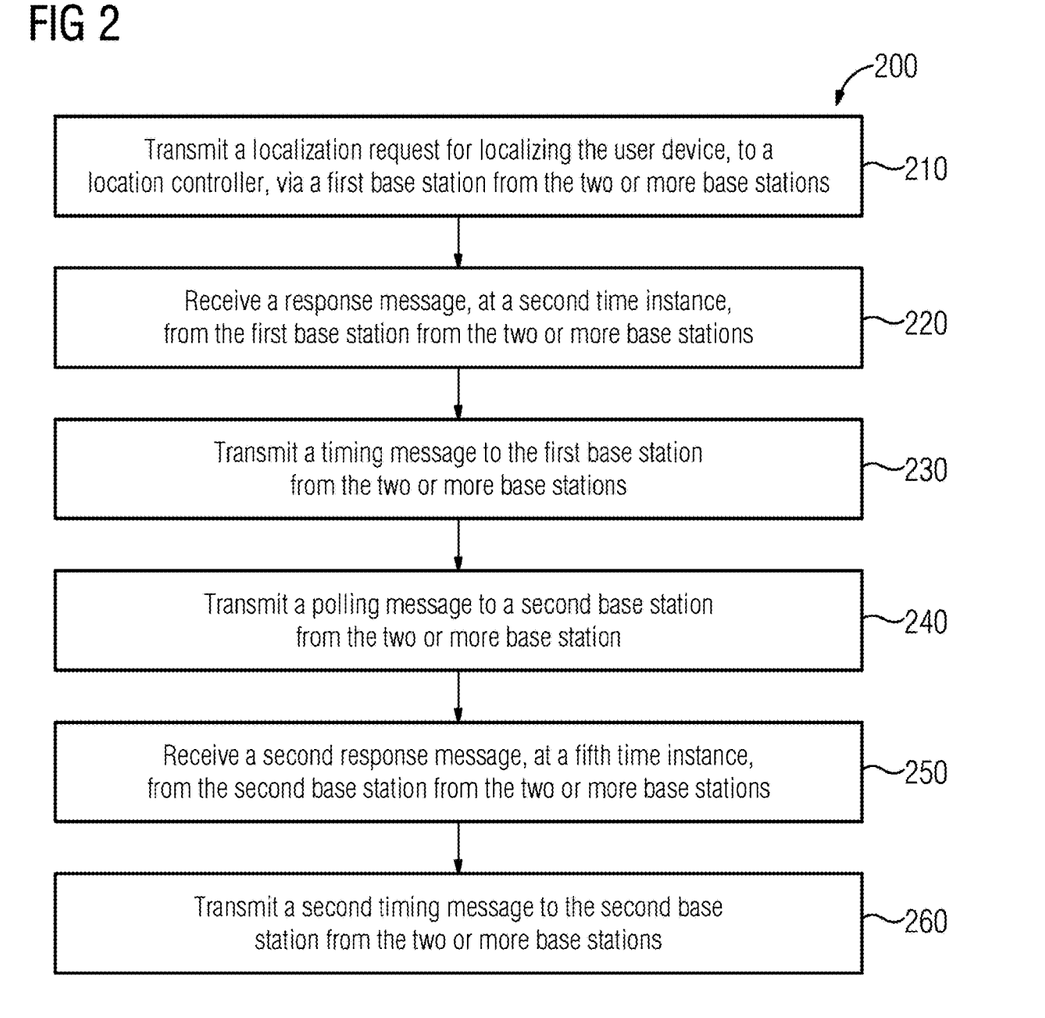
FIG. 2 illustrates an example method for determining a location of the user device in the industrial facility.

FIG. 2 illustrates a method 200 for determining a location of the user device 150 in the industrial facility 100. The user device 150 is capable of connecting to two or more base stations (shown in FIG. 1 as base stations 120, 130, and 140). The acts of the method 200 are also explained in reference to FIG. 3, which is a timing diagram showing the interactions between the user device 310, the base station 330 (also referred to as first base station 330), the base station 350 (also referred to as second base station 350), and the location controller 370.

Figure 3:
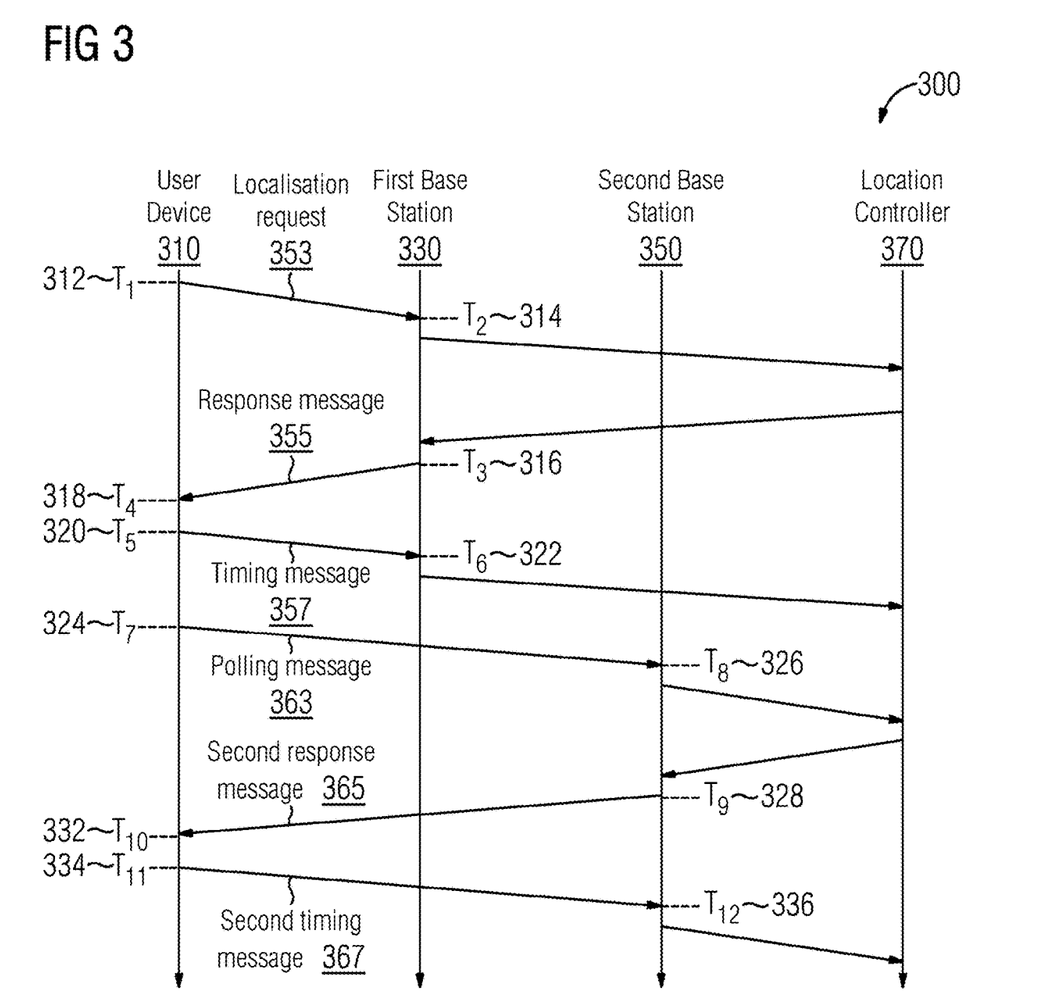
FIG. 3 is an example timing diagram illustrating a plurality of interactions between a user device, two or more base stations and a location controller, for determining a location of the user device in the industrial facility.

At act 210, the user device 310 transmits a localization request 353 for localizing the user device 310, to a location controller 370, via the first base station 330. The user device 310 transmits the localization request 353 at time instance T1 312. The localization request 353 is received by the first base station 330 at time instance T2 314. The localization request 353 is then forwarded to the location controller 370 from the first base station 330. In an example, the localization request 353 includes a timestamp associated with time instance T1 312, at which the request 353 is transmitted by the user device 310.

At act 220, the user device 310 receives a response message 355, at time instance T4 318 (also referred to as a second time instance), from the first base station 330. The response message 355 is transmitted by the first base station 330 at time instance T3 316. The response message 355 includes a first parity data generated by the location controller 370. The first parity data is generated by the location controller 370 (in response to the localization request 353) to provide that the subsequent messages in relation to the method 200 belong to the same session as the localization request 353. In an example, the first parity data includes a first identifier associated with the first base station 330 and a second identifier associated with the second base station 350. In an example, the first and second identifiers are randomly generated by the location controller 370.

At act 230, the user device 310 transmits a timing message 357 to the first base station 330 at time instance T5 320. The timing message 357 includes a second parity data based on the first parity data. In an example, the timing message 357 includes a timestamp associated with time instance T4 (the second time instance). The second parity data is for verifying the timing message 357. In an example, the second parity data is generated by the user device 310 based on cyclic redundancy check. The first base station 330 receives the timing message 357 at time instance T6 322. In an example, the first base station 330 checks the second parity data to provide that the timing message 357 relates to the localization message 353 and to provide that the timing message 357 was not corrupted during transmission.

In another example, the first base station 330 transmits the timing message 357 to the location controller 370 which then verifies the second parity data of the timing message 357.

The transmission and reception of the localization request 353, response message 355, and timing message 357 is known as the first localization communication sequence between the user device 310 and the first base station 330.

Based on the timing message 357, the location controller 370 calculates a first round time $t_{round\ 1}$ for the user device 310. The first round time $t_{round\ 1}$ is calculated by determining a time difference between time instance T1 312 (at which the localization request 353 is sent) and time instance T4 318 (at which the user device 310 receives the response message 355 from the first base station 330). Similarly, the location controller 370 calculates a second round time $t_{round\ 2}$ for the first base station 330. The second round time $t_{round\ 2}$ is calculated by determining a time difference between time instance T2 314 (at which the response message 355 is transmitted) and time instance T6 322 (at which the timing message 357 is received). Then, the location controller 370 calculates a processing time for the first base station 330 by determining time difference between time instance T2 314 (at which the localization request 353 is received by the first base station 330) and time instance T3 316 (at which the response message 355 is sent by the first base station 330). Similarly, the location controller 370 calculates a processing time for the user device 310 by determining time difference between time instance T4 318 (at which the response message 355 is received by the user device 310) and time instance T5 320 (at which the timing message 357 is sent by the user device 310). Then, the location controller 370 calculates a first time difference by subtracting the processing time for the user device 310 from the first round time $t_{round\ 1}$. Similarly, the location controller 370 calculates a second time difference by subtracting the processing time for the first base station from the second round time $t_{round\ 2}$.

At act 240, the user device 310 transmits a polling message 363 to the second base station 350. The user device 310 disconnects from the first base station 330 and connects to the second base station 350 to repeat similar set of messages with the second base station 350. The polling message 363 includes a third parity data based on the first parity data. The third parity data is for verifying the polling message akin to the timing message mentioned above. In an example, the second base station 350 checks the third parity data to provide that the polling message 363 relates to the localization message 353 and does not include any errors. In another example, the second base station 350 transmits the polling message 363 to the location controller 370 which then verifies the third parity data of the polling message 363. The user device 310 transmits the polling message 363 at time instance T7 324. The polling message 363 is received by the second base station 350 at time instance T8 326. In an example, the polling message 363 includes a time stamp associated with T7 324 time instance at which the user device 310 sends the polling message 363.

At act 250, the user device 510 receives a second response message 365 at a time instance T10 332 (also referred to as fifth time instance) from the second base station 370. The second response message 365 is indicative of the receipt of the polling message 363 by the second base station 350.

At act 260, the user device 510 transmits a second timing message 365 to the second base station 370. The second timing message 367 includes a fourth parity data based on the first parity data. The fourth parity data is for verifying the second timing message. In an example, the second timing message 367 includes a timestamp associated with the time instance T10 (i.e., fifth time instance).

The transmission and reception of the polling message 363, second response message 365, and second timing message 367 is known as the second localization communication sequence between the user device 310 and the second base station 350.

Based on the second timing message 367, the location controller 370 calculates a third round time $t_{round\ 3}$ for the user device 310 in relation to the second localization sequence. The third round time $t_{round\ 3}$ is calculated by determining a time difference between time instance T7 324 (at which the polling message 363 is sent) and time instance T10 332 (at which the user device 310 receives the second response message 365 from the second base station 350). Similarly, the location controller 370 calculates a fourth round time $t_{round\ 4}$ for the second base station 350. The fourth round time $t_{round\ 4}$ is calculated by determining a time difference between time instance T9 328 (at which the second response message 363 is transmitted) and time instance T12 336 (at which the second timing message 367 is received). Then, the location controller 370 calculates a processing time for the second base station 350 by determining time difference between time instance T8 326 (at which the polling message 363 is received by the second base station 350) and time instance T9 328 (at which the second response message 365 is sent by the second base station 350). Similarly, the location controller 370 calculates a processing time for the user device 310 in relation to the second localization communication sequence by determining time difference between time instance T10 332 (at which the second response message 365 is received by the user device 310) and time instance T11 334 (at which the second timing message 367 is sent by the user device 310). Then, the location controller 370 calculates a third time difference by subtracting the processing time for the user device from the third round time. Similarly, the location controller 370 calculates a fourth time difference by subtracting the processing time for the second base station from the fourth round time.

The location controller 370 is configured to determine the location of the user device 310 based on transmission time instances and reception time instances associated with the localization request 353, the polling message 363, the first and second response messages (355, 365), and the first and second timing messages (357, 367). As mentioned previously, based on transmission time instances and reception time instances associated with the localization request 353, the polling message 363, the first and second response messages (355, 365), and the first and second timing messages (357, 367), the location controller 370 determines the first, second, third, and fourth time differences. Then, based on the first, second, third, and fourth time differences, the location controller 370 determines the user device 310 using a plurality of localization techniques. In an example, the location of the user device 310 is determined using a two way ranging (TWR) technique. The two-way ranging technique determines the signal runtime (flight time) of a signal and then calculates the distance between the devices (i.e., the user device and the base stations) by multiplying the time by the speed of light. The TWR process is applied between the user device 310 and the base stations. Positions of the base stations are already known to the location controller 370 and accordingly, using the time differences calculated the location controller 370 determines the position of the user device 310.

The usage of the parity information provides that the location calculation is performed reliably, since the validity of the messages are secured by a corresponding parity information. For example, an error in generation, transmission, and calculation may be detected. Thus, a technically simple implementation is achieved, in which errors or manipulations may be detected during the determination of location of the user device 310. Additionally, since the determination of the location of the user device is done based on time differences calculated in relation to two different base stations, the overall reliability and accuracy of the determined location is also further improved.

In an example, the first base station is capable of determining an angle of arrival associated with the localization message (which is received by the first base station). Similarly, the first base station in capable of determining the angle at which the response message 355 is sent. In an example, these angles may be included in the response message 355.

In another example, the second base station is capable of determining angle of arrival associated with the polling message 363 received by the second base station. Similarly, the second base station in capable of determining the angle at which the second response message 365 is sent. In an example, these angles may be included in the second response message 365.

In an example, in addition to the time stamps, the timing message (357 and 367) includes an angle of arrival indicative of the angle at which the signal associated with the response message (355, 365) is received by the user device 310. Additionally, the timing message (357, 367) further includes an angle of departure indicative of the angle of the antenna of the user device 310 when the timing message (357, 367) is sent.

In an example, the location controller is configured to utilize the above mentioned angles of arrival and angles of departure in determining the location of the user device.

In an example, the localization request and the polling message over one of a physical random access channel and physical uplink shared channel. Similarly, in an example, the timing message and the second timing message are sent over a physical uplink shared channel. Additionally, the response message and the second response message are sent over a physical downlink shared channel.

In an example, the above mentioned messages, including the localization message (353), the polling message (363), and timing messages (357 and 367), are transmitted via positioning reference signals (PRS). For example, an example positioning reference signal associated with the above messages, include a plurality of symbols. From the plurality of symbols, a first set of symbols are associated with a pseudo random sequence and a second set of symbols are used for transporting the payload (e.g., the time stamp and the parity data). For example, the second set of symbols include a payload indicative of the timestamp of the second time instance or the fifth time instance. In an example, the pseudo random sequence may be used for determining time of arrival as well.

It may be noted, that while the above method is illustrated with the timestamps of the second time instance and fifth time instance being transmitted by the timing message 357 and the second timing message 367 respectively, in another example, all the time stamps associated with time instance T1 (transmission of localization request 353 by the user device 310), time instance T4 (receipt of the response message 355 at the user device 310), time instance T5 (transmission of timing message 357 by the user device 310), time instance T7 (transmission of polling message 363 by the user device 310), time instance T10 (receipt of the second response message 365 at the user device 310) and time instance T11 (transmission of the second timing message 367), may be transmitted in the second timing message 367. Similarly, in another example, the first timing message includes the time instances associated with the first localization sequence while the second timing message includes the time instances associated with the second localization sequence.

While, in the above example, the first and second identifiers associated with the first and second base station are transmitted via the response message 355, in another example, the second identifier is not transmitted by the response message 355. Accordingly, the response message 355 includes the first identifier associated with the first base station. The second identifier associated with the second base station is transmitted in the second response message 365.

While the above disclosure is explained using user device 310, aspects of the disclosure are also realized by the location controller. This is further explained using FIG. 4.

Figure 4:
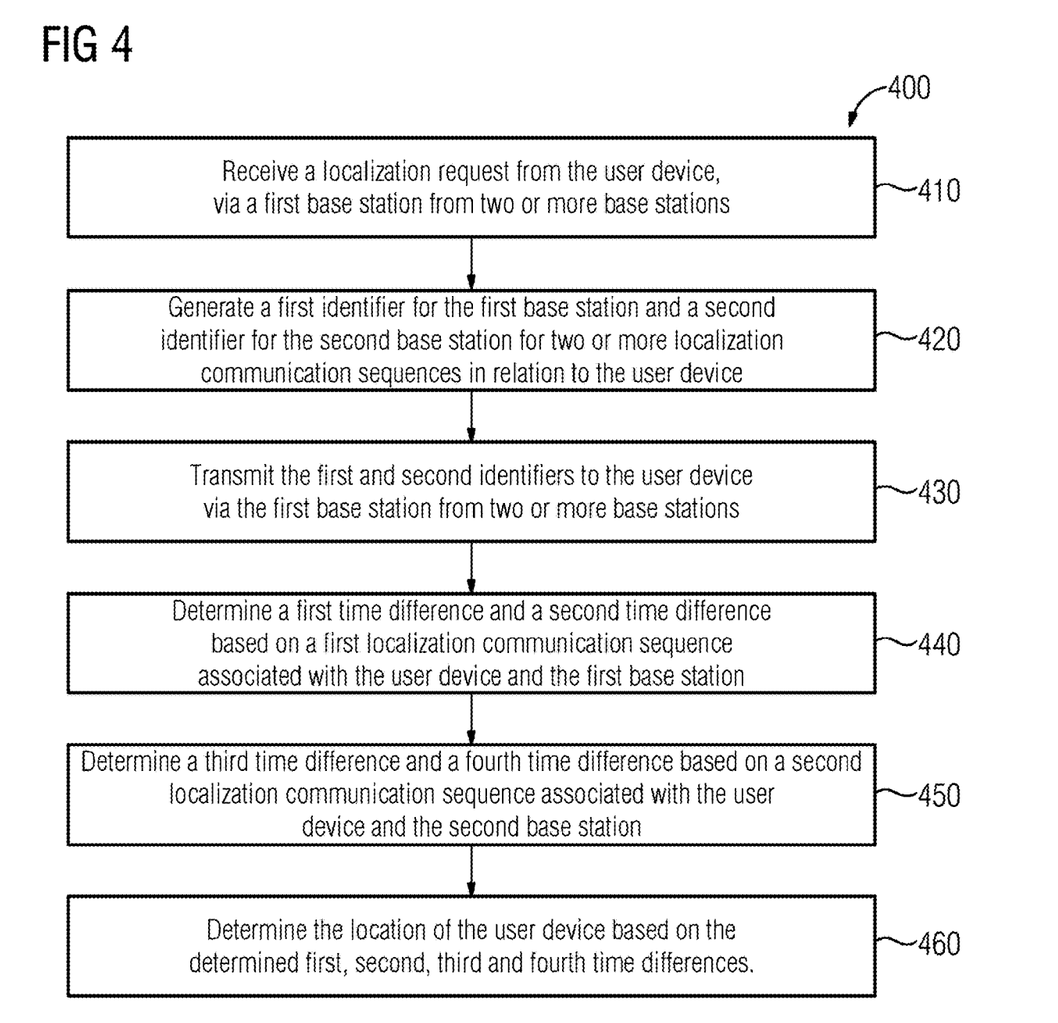
FIG. 4 illustrates an example method for determining a location of the user device, by the location controller.

FIG. 4 illustrates a method 400 for determining a location of a user device in an industrial facility. The method 400 is performed by the location controller 370. At act 410, the location controller 370 receives a localization request 353 from the user device 310, via a first base station 330 from two or more base stations (330, 350).

At act 420, the location controller 370 generates a first identifier for the first base station 330 and a second identifier for the second base station 350 for two or more localization communication sequences as mentioned above, in relation to the user device 310.

At act 430, the location controller 370 transmits the first and second identifiers to the user device 310 via the first base station 330. The first and second identifiers are used by the user device 310 for generating one or more parity data included in messages of the two localization communication sequences.

At act 440, as mentioned above, the location controller 370 determines a first time difference and a second time difference based on the first localization communication sequence associated with the user device 310 and the first base station 330.

At act 450, the location controller 370 determines a third time difference and a fourth time difference based on the second localization communication sequence associated with the user device 310 and the second base station 350.

At act 460, as mentioned above, the location controller 370 determines the location of the user device 310 based on the determined first, second, third, and fourth time differences.

While the above mentioned methods 200 and 400 are described using two base stations, additional base stations may also be utilized in order to improve the efficiency of the localization of the user device. For example, third and fourth base stations may be used according to the methods 200 and 400.

Figure 6:
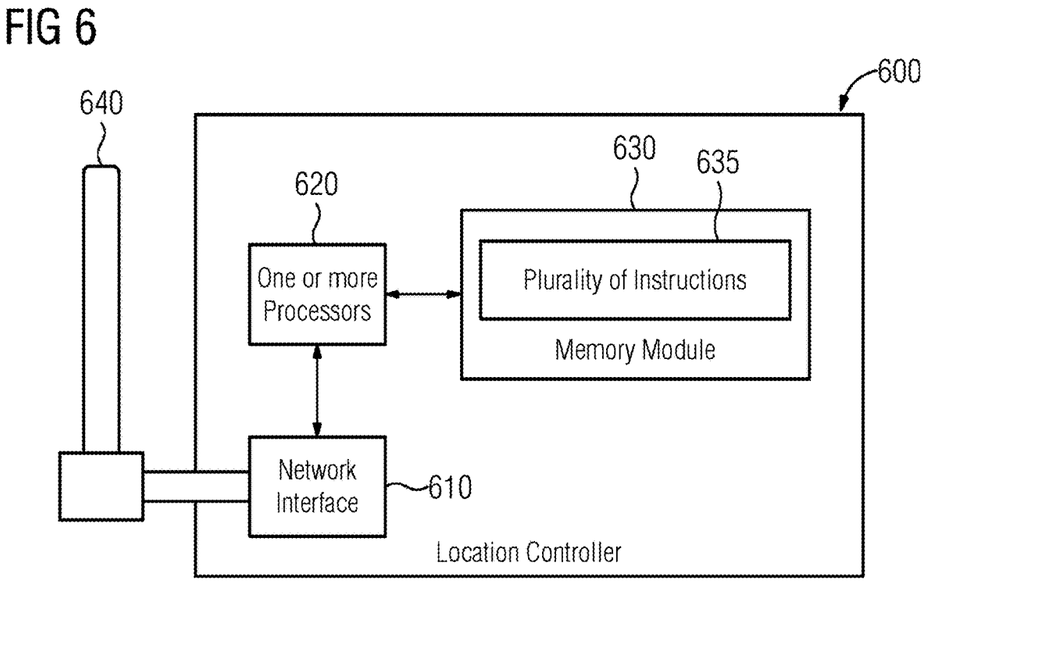
FIG. 6 illustrates an example location controller for determining the location of the user device.

In an example, a separate network slice of the wireless network is allocated for communication with the location controller 600. Since the behavior of user devices while performing the localization method as described above, is different from conventional behavior of the user devices, creation of the separate network slice allows for isolation from the standard production/plant network. Conventionally, user devices remain connected to a serving base station and only look or connect to another base station, if the connection to the serving base station is disrupted due to interference or is outside the coverage of the serving base station. In the current case, the user device will switch from one base station to another as described in the methods above. Additionally, a part of the licensed frequency spectrum is allocated for the localization communication sequences between the user devices, the base stations and the location controller 600.

In an example, wherein the wireless network is based on 5G specifications, the first base station 330 and the second base station 350 utilize time division duplex (TDD) slots. TDD Slots for Uplink and Downlink may be flexibly assigned and changed also on the basis of the load. Flexible slots are also available where some symbols of the same slot may be set as up-link and others are as downlink. Additionally, the first and the second base stations (330, 350) are synchronized such that same time division duplet slots of the first and second base stations (330, 350) are assigned to the same user devices. For example, a TDD slot of the first base station 330 and a TDD slot of the second base station 350, which are scheduled in the time period, are only allocated to the user device 310.

The present disclosure may take a form of a computer program product including program modules accessible from computer-usable or computer-readable medium storing program code for use by or in connection with one or more computers, processing units, or instruction execution system.

Figure 5:
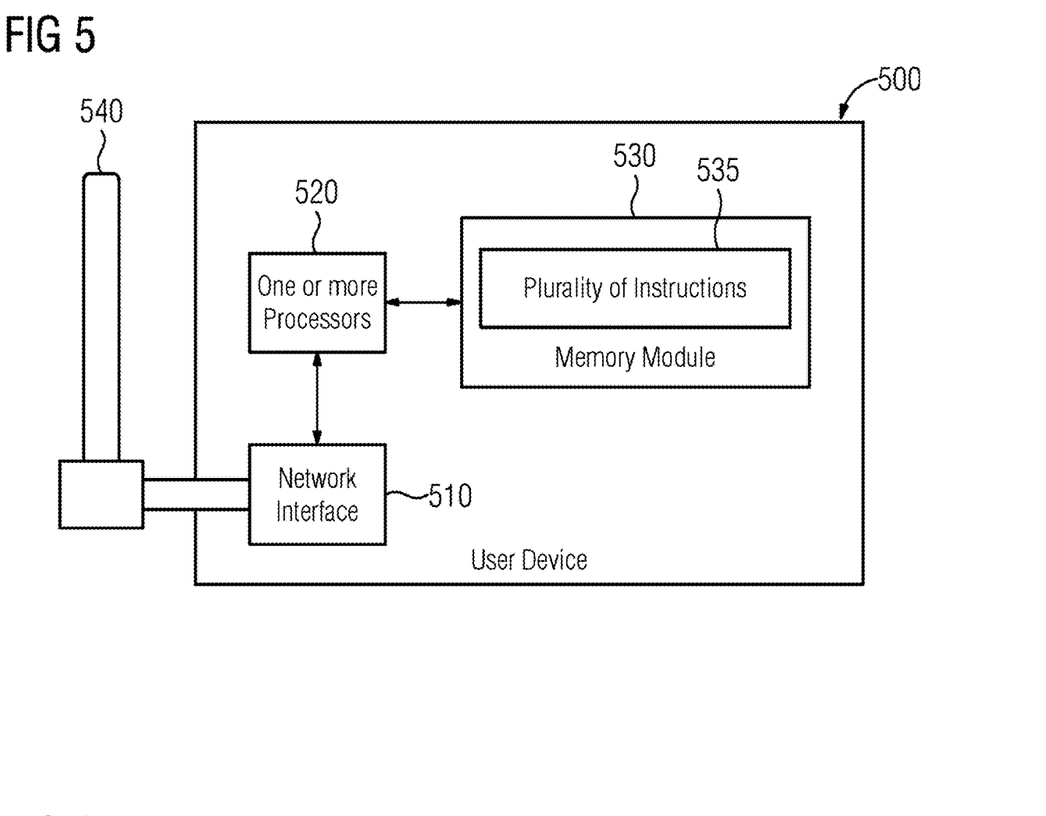
FIG. 5 illustrates an example user device configured to determine the location of the user device in the industrial facility.

Accordingly, the current disclosure describes a user device 500 as shown in FIG. 5. The user device 500 is configured determining a location of the user device 500 in an industrial facility. The user device 500 is capable of communicating to two or more base stations (330 and 350).

The user device 500 includes a network interface 510 connectable to the first base station 330 and the second base station 350 for receiving and transmitting data. The user device 500 further includes one or more processors 520 coupled to a memory module 530 (also referred to as non-transitory storage medium). The memory module 530 includes a plurality of instructions 535, which when executed on the one or more processors 520 cause the one or more processors 520 to: transmit a localization request for localizing the user device, to a location controller, via a first base station from the two or more base stations; receive a response message, at a second time instance, from the first base station, wherein the response message includes a first parity data generated by the location controller; transmit a timing message to the first base station, wherein the timing message includes a timestamp associated with the second time instance and a second parity data based on the first parity data, wherein the second parity data is for verifying the timing message; transmit a polling message to a second base station from the two or more base station, wherein the polling message includes a third parity data based on the first parity data, wherein the third parity data is for verifying the polling message; receive a second response message, at a fifth time instance, from the second base station; and transmit a second timing message to the second base station, wherein the second timing message includes a timestamp associated with the fifth time instance and a fourth parity data based on the first parity data, wherein the fourth parity data is for verifying the second timing message. The location controller is configured to determine the location of the user device based on transmission time instances and reception time instances associated with the localization request, the polling message, the first and second response messages, and the first and second timing messages.

Similarly, the current disclosure describes a location controller 600 as shown in FIG. 6. The location controller 600 is for determining a location of a user device in the industrial facility. The location controller 600 includes a network interface 610 for communicating with the two or more base stations in the industrial facility. Additionally, the location controller 600 further includes one or more processors 620 coupled to a memory module 630 (also referred to as non-transitory storage medium 630). The memory module 630 includes a plurality of instructions 635, which when executed on the one or more processors 620, cause the one or more processors 620 to: receive a localization request from the user device, via a first base station from two or more base stations; generate a first identifier for the first base station and a second identifier for the second base station for two or more localization communication sequences in relation to the user device; transmit the first and second identifiers to the user device via the first base station, wherein the first and second identifiers are used by the user device for generating one or more parity data included in one or more messages of the two or more localization communication sequences; determine a first time difference and a second time difference based on a first localization communication sequence associated with the user device and the first base station; determine a third time difference and a fourth time difference based on a second localization communication sequence associated with the user device and the first base station; and determine the location of the user device based on the determined first, second, third, and fourth time differences.

For the purpose of this description, a computer-usable or computer-readable non-transitory storage medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology may be centralized or distributed (or a combination thereof) as known to those skilled in the art.

While the current disclosure is described with references to few industrial devices, a plurality of industrial devices may be utilized in the context of the current disclosure. While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be applied to device/non transitory storage medium claims.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

What is claimed is:

1. A method for determining a location of a user device in an industrial facility, the user device connectable to two or more base stations, the method comprising:
   transmitting, by the user device, a localization request for localizing the user device to a location controller via a first base station of the two or more base stations;
   generating, by the location controller, a first identifier and a second identifier for two or more localization communication sequences in relation to the user device;
   generating, using the first identifier and the second identifier, one or more parity data included in one or more messages of the two or more localization communication sequences;

receiving, by the user device, a first response message, at a second time instance, from the first base station, wherein the first response message comprises a first parity data generated by the location controller of the one or more parity data, wherein the first parity data comprises the first identifier associated with the first base station and the second identifier associated with a second base station of the two or more base stations, and wherein, based on the first parity data, the location controller provides that subsequent messages from the user device belong to a same session including the localization request;

transmitting, by the user device, a timing message to the first base station, wherein the timing message comprises a second parity data of the one or more parity data based on the first parity data, wherein the second parity data is for verifying the timing message, and wherein the first base station checks the second parity data to provide that the timing message is associated with the localization request;

transmitting, by the user device, a polling message to the second base station, wherein the polling message comprises a third parity data based on the first parity data, wherein the third parity data is for verifying the polling message, and wherein the second base station checks the third parity data to provide that the polling message is associated with the localization request;

receiving, by the user device, a second response message, at a fifth time instance, from the second base station; and transmitting, by the user device, a second timing message to the second base station, wherein the second timing message comprises a fourth parity data based on the first parity data, and wherein the fourth parity data is for verifying the second timing message, wherein the location controller, along with the first base station and the second base station, is configured to determine the location of the user device based on a plurality of time differences determined using transmission time instances and reception time instances associated with the localization request, the polling message, the first response message, the second response message, the first timing message, and the second timing message.

2. The method of claim 1, wherein the timing message further comprises a timestamp associated with the second time instance, and wherein the second timing message further comprises a timestamp associated with the fifth time instance.

3. The method of claim 1, wherein the timing message further comprises a positioning reference signal comprising a plurality of symbols, and wherein a set of symbols from the plurality of symbols is associated with a time stamp of the second time instance.

4. The method of claim 1, wherein the localization request is transmitted over one of a physical random access channel and physical uplink shared channel.

5. The method of claim 1, further comprising:
receiving positioning initialization message from the location controller prior to transmitting the localization request.

6. The method claim 1, wherein the first base station and the second base station comprise a first time slot assigned for the user device.

7. A method for determining a location of a user device in an industrial facility, the user device connectable to two or more base stations, the method comprising:
receiving, by a location controller, a localization request from the user device via a first base station of the two or more base stations;

generating, by the location controller, a first identifier for the first base station and a second identifier for a second base station of the two or more base stations for two or more localization communication sequences in relation to the user device;

generating, using the first identifier and the second identifier, one or more parity data included in one or more messages of the two or more localization communication sequences;

transmitting, by the location controller to the user device by via the first base station, first parity data generated by the location controller, wherein the first parity data comprises the first and second identifiers, and wherein, based on the first parity data, the location controller provides that subsequent messages from the user device belong to a same session associated with the corresponding two or more localization communication sequences;

determining, by the location controller, along with the first base station, a first time difference and a second time difference based on a first localization communication sequence associated with the user device and the first base station;

determining, by the location controller, along with the second base station, a third time difference and a fourth time difference based on a second localization communication sequence associated with the user device and the second base station; and determining, by the location controller, the location of the user device based on the first time difference, the second time difference, the third time difference, and the fourth time difference.

8. The method of claim 7, wherein the first localization communication sequence comprises the localization request from the user device to the first base station, a first response message from the first base station to the user device, and a timing message from the user device to the first base station,
wherein the first response message comprises the first identifier associated with the first base station,
wherein the timing message comprises a timestamp associated with time instance at which the first response message is received by the user device, and the first parity data, and
wherein the first parity data is for verifying the timing message.

9. The method of claim 7, wherein the second localization communication sequence comprises a polling message from the user device to the second base station, a second response message from the second base station to the user device, and a second timing message from the user device to the second base station,
wherein the second timing message comprises a timestamp associated with time instance at which the second response message is received by the user device, and a second parity data based on the second identifier associated with the second base station, and
wherein the second parity data is for verifying the second timing message.

10. A location controller for determining a location of a user device in an industrial facility, the user device connectable to two or more base stations, the location controller comprising:
    one or more processors connected to a memory, the one or more processors configured to:
        receive a localization request from the user device via a first base station of the two or more base stations;
        generate a first identifier for the first base station and a second identifier for a second base station of the two or more base stations for two or more localization communication sequences in relation to the user device;
        transmit, to the user device via the first base station, first parity data generated by the location controller, wherein the first parity data comprises the first and second identifiers, wherein the first and second identifiers are used by the user device for generating one or more parity data included in one or more messages of the two or more localization communication sequences, and wherein, based on the first parity data, the location controller provides that subsequent messages from the user device belong to a same session associated with the corresponding two or more localization communication sequences;
        determine, along with the first base station, a first time difference and a second time difference based on a first localization communication sequence associated with the user device and the first base station;
        determine, along with the second base station, a third time difference and a fourth time difference based on a second localization communication sequence associated with the user device and the second base station; and
        determine the location of the user device based on the first time difference, the second time difference, the third time difference, and the fourth time difference.

\* \* \* \* \*